Figure 1:
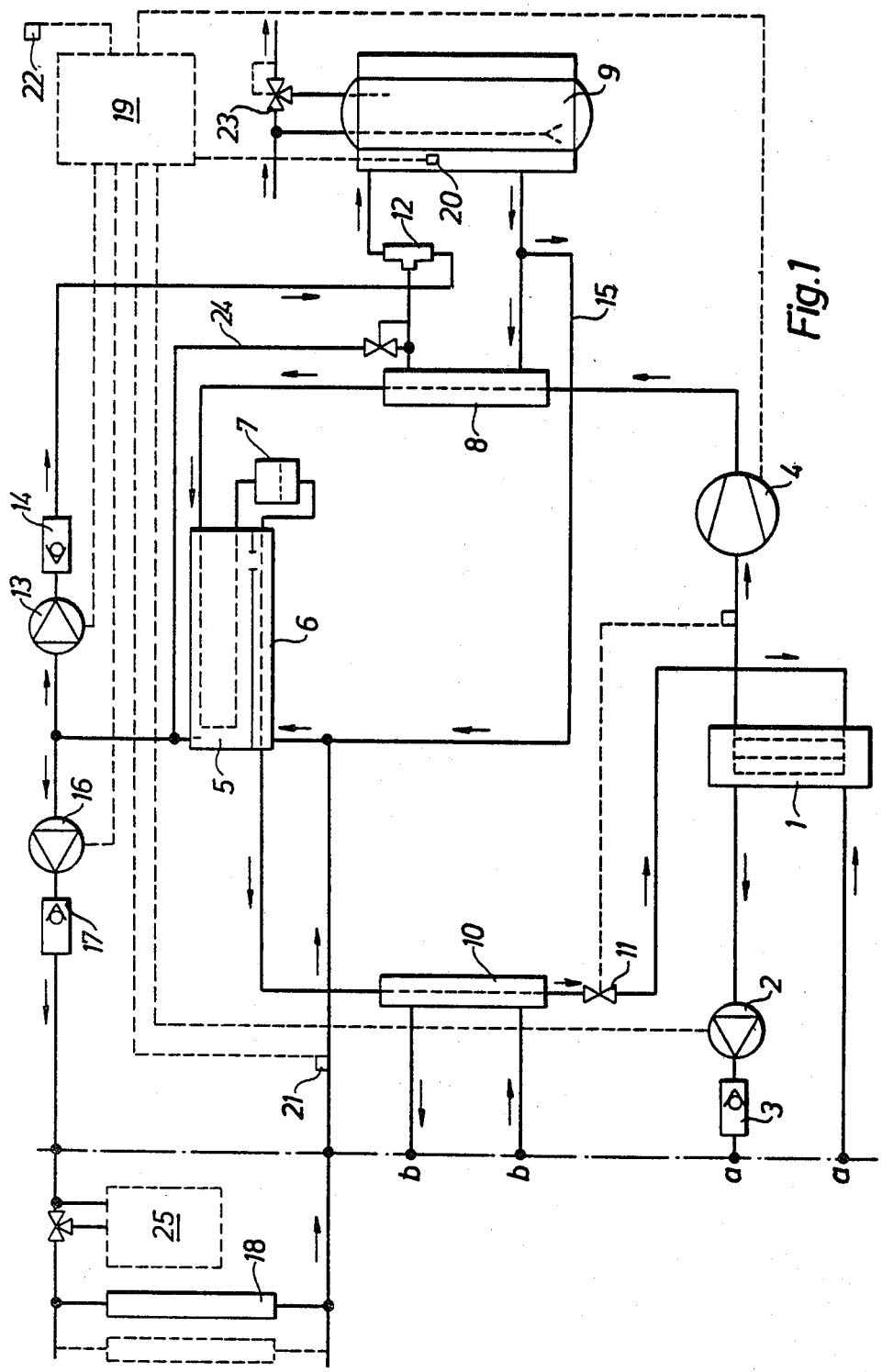

United States Patent [19]

Granryd

[11] 4,429,547
[45] Feb. 7, 1984

[54] ARRANGEMENT IN A HEAT PUMP PLANT

[75] Inventor: Eric Granryd, Täby, Sweden

[73] Assignee: AB Thermia-Verken, Arvika, Sweden

[21] Appl. No.: 356,620

[22] Filed: Mar. 10, 1982

[30] Foreign Application Priority Data

Mar. 20, 1981 [SE] Sweden .............................. 81017683

[51] Int. Cl.³ ........................................... F25B 27/02
[52] U.S. Cl. ..................................... 62/238.6; 62/183
[58] Field of Search ..................... 62/238.6, 183, 506; 237/2 B

[56] References Cited

U.S. PATENT DOCUMENTS

| | | | |
|---|---|---|---|
| 3,177,929 | 4/1965 | Jennings | 62/183 X |
| 3,305,001 | 2/1967 | Haufler et al. | 62/183 X |
| 3,481,152 | 12/1969 | Seeley | 62/183 |
| 3,989,183 | 11/1976 | Gustafsson | 62/238.6 X |
| 4,055,963 | 11/1977 | Shoji et al. | 62/238.6 |
| 4,098,092 | 7/1978 | Singh | 62/238.6 |
| 4,299,098 | 11/1981 | Derosier | 62/238.6 |
| 4,364,239 | 12/1982 | Chapelle et al. | 62/238.6 X |
| 4,373,345 | 2/1983 | Tyree, Jr. et al. | 62/238.6 X |
| 4,373,346 | 2/1983 | Hebert et al. | 62/238.6 X |

*Primary Examiner*—Lloyd L. King
*Attorney, Agent, or Firm*—Pollock, Vande Sande & Priddy

[57] ABSTRACT

In a heat pump plant, a hot gas heat exchanger (8) is connected to the refrigerant circuit between a compressor (4) and a condenser (5) having a built-in sub-cooler (6), the heating medium side of said hot gas heat exchanger being connected to a domestic water heating device (9). An extra sub-cooler (10) having its heating medium side connected to a separate low temperature heating circuit is interconnected between the built-in sub-cooler and an expansion valve (11). An ejector (12) is connected to the supply line from the hot gas heat exchanger to the domestic water heating device, said ejector being also connected via a domestic water heating pump (13) to the heating medium outlet of the condenser-sub-cooler combination (5, 6). The return line from the domestic water heating device to the hot gas heat exchanger is connected via a line (15) to the heating medium inlet of the condenser-sub-cooler combination. The domestic water heating pump is arranged to provide a flow of water to the ejector via a domestic hot water temperature sensing means, when the domestic hot water temperature is below a predetermined level. The radiator water heating pump included in the radiator circuit is arranged to provide a flow of water through the radiator circuit when the radiator water temperature is below a level corresponding to the outdoor temperature, both pumps being adapted to operate at the various temperature levels prevailing in the domestic water and radiator water circuits.

6 Claims, 4 Drawing Figures

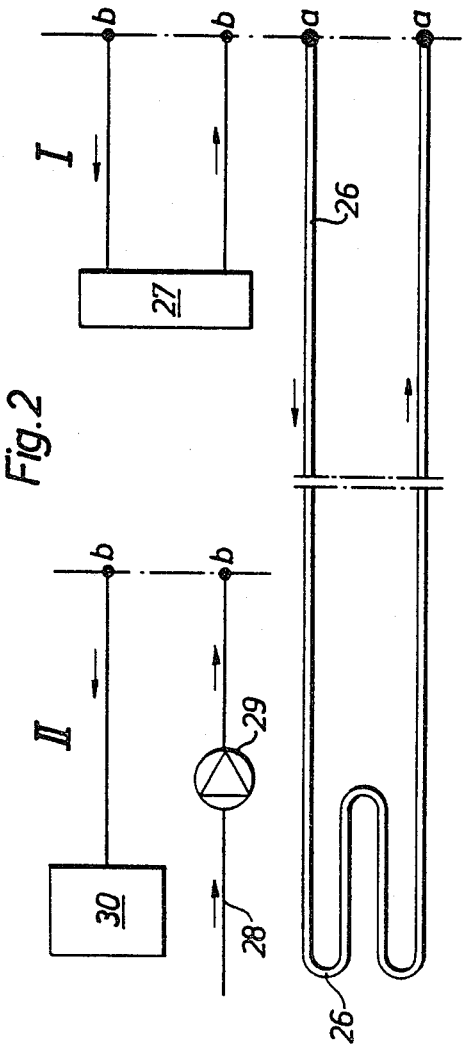
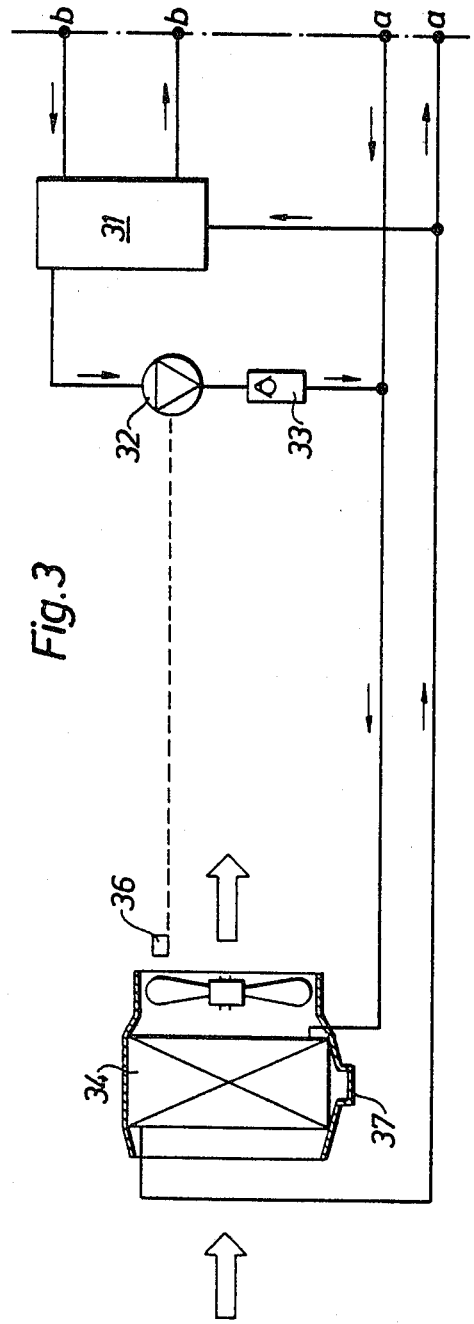

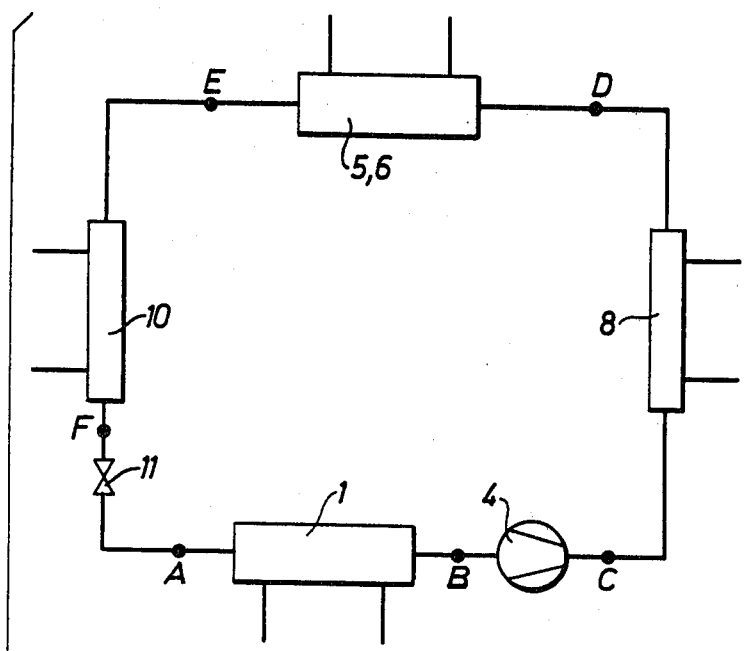
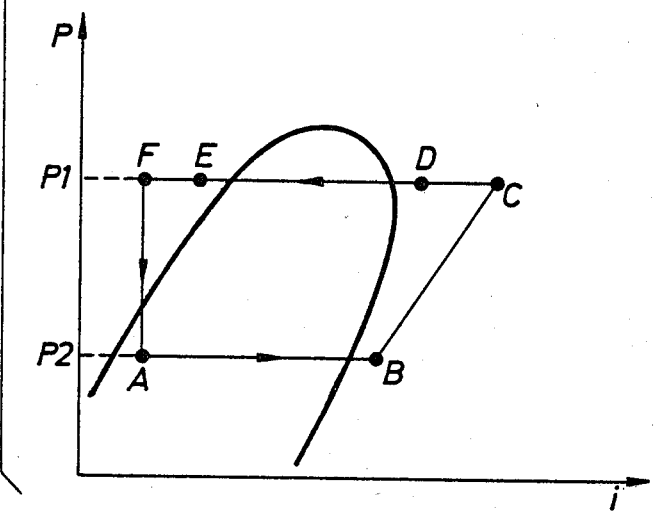
Fig. 4

ARRANGEMENT IN A HEAT PUMP PLANT

The present invention relates to an arrangement in a heat pump plant, in which a refrigerant circuit comprises an evaporator, a compressor, a condenser having a built-in sub-cooler, and an expansion valve, said condenser being connected via a radiator water heating pump to a radiator circuit on the heating medium side.

It is generally desirable to improve the heat factor in heat pumps which in practice may be accomplished by eliminating losses to the largest possible extent. This applies to losses in the heat pump unit as well as in the circuit of the heat source. Thus, when using the ambient air as a heat source, the defrosting losses must be kept as low as possible. More specifically, it is desirable to obtain the possibility of operation at the lowest possible condensing temperature in heat pumps for parallel heating of domestic water and radiator water.

In some of the present plants the object of the heat pump is to maintain a supply of heated water for covering the demand of domestic hot water. In such a plant, the radiator heating water is adjusted to an appropriate temperature by means of e.g. a shunt valve. It is a disadvantage of such an arrangement that in all operational conditions occuring over a year the heat pump has to operate at a relatively high condensation temperature which is due to the fact that it is normally desirable to obtain a domestic hot water temperature of at least about 50° C. Even if the radiator system could be operated at a considerably lower temperature than about 50° C. during the major portion of the year, heat must be generated by the heat pump at the temperature level determined by the domestic hot water temperature.

The object of the present invention is to provide such an arrangement in a heat pump plant which minimizes losses and enables operating at the lowest possible condensation temperature. The arrangement is generally characterized in that a hot gas heat exchanger is connected to the refrigerant circuit between the compressor and the condenser, the heating medium side of said hot gas heat exchanger being connected to a domestic water heating device, an extra sub-cooler being connected between said built-in sub-cooler and said expansion valve, the heating medium side of said extra sub-cooler being connected to a separate heating circuit. Furthermore, the heating medium outlet of the condenser—sub-cooler combination is connected to the feeding line from the hot gas heat exchanger to the domestic water heating device via a domestic water heating pump, and the heating medium inlet of the condenser—sub-cooler combination is connected to the return line from the domestic water heating device to the hot gas heat exchanger.

The invention will be described in more detail with reference to the accompanying drawings on which FIG. 1 illustrates a block diagram of heat pump plant, FIGS. 2 and 3 illustrate different methods of utilizing the extra sub-cooler of the heat pump in different heat sources, and FIG. 4 illustrates the content of heat of the refrigerant in different portions of the heat pump.

FIG. 1 illustrates an evaporator 1, the cooling-medium (brine) side of which is connected to a soil heat circuit at a-a. The refrigerant circuit of evaporator 1 comprises a compressor 4 connected to a hot gas heat exchanger 8. The latter is in turn followed by a condenser 5 which is combined with a sub-cooler 6, a receiver 7 being connected between the condenser and the sub-cooler. The outlet of the sub-cooler is connected to an extra sub-cooler 10 which is connected to evaporator 1 via an expansion valve 11. The valve 11 is adapted to be actuated by the temperature in the line between evaporator 1 and compressor 4, as is known in the art. The heating medium side of the extra sub-cooler 10 is connected to a separate heating circuit at b-b.

The heating medium side of the hot gas heat exchanger 8 is connected to a domestic water heating device 9 which is thus supplied with cold water and from which hot water is drawn. A control valve 23 is connected to these cold and hot water lines. The temperature in the vessel surrounding the hot water container is sensed by a temperature sensing means 20 which is connected to the control equipment 19. An ejector 12 is connected in the feeding line from the hot gas heat exchanger to the domestic water heating device. The ejector is also connected to the heating medium outlet of condenser 5 via return valve 14 in series with a domestic water heating pump 13. The return line from the domestic water heating device is connected to the hot gas heat exchanger and to the heating medium inlet of the condenser—sub-cooler combination 5,6. An overflow line 24 connecting the feeding line to the heating medium outlet of condenser 5 is inter-connected between the hot gas heat exchanger and the ejector via a thermostat valve.

The heating medium outlet of condenser 5 is also connected via a radiator heating pump 16 and a non-return valve 17 to a circuit comprising a number of radiators 18, said circuit being connected also to the heating medium inlet of the condenser—sub-cooler 5,6. It is also possible to connect a heating boiler 25 to the radiator circuit via a shunt valve, e.g. a fuel oil boiler for additional heating. The temperature of the radiator circuit is sensed by a temperature sensing means 21 which is connected to the control equipment 19.

A means 22 for sensing the ambient air temperature connected to the control equipment is also included in the plant. The control equipment 19 actuates pump 2 of the cooling medium circuit, compressor 4, domestic hot water heating pump 13 and radiator water heating pump 16. The hot gas heat exchanger 8 included in the plant as well as the extra sub-cooler 10 may be provided with a device for electric heating, e.g. an electric heating element, for producing additional heating.

The general function of a heat pump plant is assumed to be known, reference being made to e.g. the publications "Heat Pumps", Symposium in Stockholm 26–27th November 1974, National Board of Building Research, Publication T2:1975, and "Heat Pump Plants", report No. 89, 1976 of The Scientific Academy of Engineering (IVA).

In the above described plant, the refrigerant circuit comprises a hot gas heat exchanger 8 between compressor 4 and condenser 5, and an extra sub-cooler 10 between condenser—sub-cooler combination 5,6 and expansion valve 11. In addition, a radiator heating pump 16 for the radiator circuit and a water heating pump 13 for the domestic water heating circuit are connected to the heating medium outlet of condenser 5. The temperature of the domestic water heating circuit is sensed by the means 20. The hot gas heat exchanger 8 emits heat to this circuit via its heating outlet. If the sensed temperature has not risen to the desired level by this heat transmission, which is based on circulation by natural convection, pump 13 is started which pumps water from condenser 5 through ejector 12 to the domestic water heating device 9, said ejector being connected in the supply line. Furthermore, the ejector avoids short circuiting of the hot gas heat exchanger when pump 13 is activated. During the time of operation of pump 13, radiator water heating pump 14 is out of operation.

As mentioned, control equipment 19 receives incoming signals related to the temperature in the domestic water heating device and the radiator water return line, and to the out-door temperature. When sensing the temperature in the control equipment, the sensing of the domestic temperature is given priority, whereby, if the hot water temperature is below a fixed level, pump 13 is started and pump 16 in the radiator circuit is kept out of operation. This condition of operation continues until the domestic hot water temperature has reached the fixed level. During this course of event the entire condenser area and the hot gas heat exchanger are used for the domestic water heating. This is important since it provides good opportunities of maintaing the temperature difference between the condensation temperature and the water discharged to the domestic water heating device at a minimum. When the domestic hot water temperature is high enough pump 13 is shut off and pump 16 is started instead. If the temperature in the radiator water line is then below the preferred level, i.e. if heating is required, pump 16 continues its operation until the desired radiator temperature is reached. During this period domestic water can still be heated via hot gas heat exchanger 8 due to the above mentioned circulation by natural convection.

Heating medium pump 2 and compressor 4 are in operation when heating is required in any of the circuits. If additional heating is required in the domestic water heating circuit, an electric heating element, for instance, may be used in the hot gas heat exchanger 8. If additional heating is required in the radiator water circuit, a fuel oil or electric boiler 25 may be connected to the radiator water supply line via a shunt valve, as mentioned above. The additional heating by an electric element in hot gas heat exchanger 8 may also be carried out in such a way that both pumps 13 and 16 operate in parallel. This source of heat may of course also be used as heat reserve. As mentioned, an extra sub-cooler 10 is interconnected in the refrigerant circuit between the condenser and the expansion valve. When evaporator 1 is connected to a soil heat circuit 26, a low temperature circuit 27, e.g. for heating certain basement premises, may be connected to the heating medium outlet b-b of said extra sub-cooler, in accordance with alternative I in the Figure. According to alternative II in the Figure the heating medium side b-b of the extra sub-cooler is connected to an air heating circuit 30. The supplied air 28 is drawn e.g. from the atmosphere by a fan 29 through the extra sub-cooler.

If evaporator 1 of the heat pump is connected to an air heat exchanger, the extra sub-cooler 10 may be used for defrosting the heat exchanger. This may be carried out in the manner shown by the embodiment in FIG. 3. The air heat exchanger 34 with its drip pan 37 and fan is connected at a-a to evaporator 1. The heating medium outlet of the extra sub-cooler is connexted at b-b to a storage vessel 31. The heat content of the sub-cooler is transferred to and heats this vessel. The vessel is connected via a pump 32 in series with a non-return valve 33 through the line to the air heat exchanger. Adjacent thereto is provided a temperature sensing means 36 which is adapted to actuate pump 32 via a control device (not shown). If the temperature of the air heat exchanger is below a certain level, e.g. +5° C., which means that the air heat exchanger could be exposed to ice formation, the control device is made such that pump 32 is activated at regular intervals. Heated medium in vessel 31 will then be conveyed through and heat up heat exchanger 34 which is then defrosted. The drip pan is preferably heated electrically at the same time in order to defrost the same. During defrosting period the heat pump is made non-operative, i.e. fan 32, pump 2 and compressor 4. The duration of the defrosting interval is a few minutes. The period between the intervals depends on the air humidity and the fan design. The time between two intervals is about 1-3 hours. It is of course possible also to control the defrosting entirely in relation to the prevailing defrosting requirement, as can be shown in various known manners.

FIG. 4 illustrates the refrigerant circuit of the heat pump plant including the essential means of this circuit. Connected in series are thus evaporator 1, compressor 4, hot gas heat exchanger 8, condenser—sub-cooler combination 5,6 extra sub-cooler 10, and expansion valve 11. A halogen refrigerant is used in the refrigerant circuit, e.g. that sold under the name of Freon, and some of the types R22 or R502 thereof. FIG. 4, lower picture, illustrates the principal outline of the status graph of the refrigerant used. The axes x and y represent enthalpy i and pressure p, respectively, p2 being the evaporation pressure and p1 the condensation pressure of the used refrigerant. In the graph, the course of heat absorption in evaporator 1 is represented by the change of status A→B, the course of compression in compressor 4 by B→C, the emission of heat in hot gas heat exchanger 8 by C→D, the emission of heat in condenser and sub-cooler 5,6 by D→E, the emission of heat in extra sub-cooler 10 by E→F, and finally, the course of throttling in expansion valve 11 is represented by the change of status F→A.

In order to make maximum use of the heat of the refrigerant downstream of the receiver (i.e. before throttling and feeding to the evaporator) the sub-cooling can be obtained by means of incoming radiator water, as is known. In the embodiment shown in FIG. 1 a sub-cooler 6 having this function has therefore been combined with condenser 5. The change of temperature of the water of the radiator circuit may be in the order of 10° C., and consequently, sub-cooling of the condensate to e.g. 8° to 9° C. can take place at a reasonable thermal efficiency of the sub-cooler. With e.g. refrigerant R22 this results in an improvement of the cooling effect at actual circumstances by 7 to 8%, whereby an increased heating effect in the order of 5% is obtained in heat pump operation. It is also possible to increase the annual heating factor by this percentage. In a normal case, the demand of electric energy in a heat pump having a sub-cooler circuit can be reduced by about 400 kWh/year as compared with an embodiment lacking such sub-cooler.

Downstream of sub-cooler 6 the liquid has a temperature which in most cases of operation exceeds the room temperature considerably. By connecting the extra sub-cooler 10 the heat content of this liquid can be extracted and used for heating a low temperature circuit. An example of such use is the mentioned method of defrosting an air heat exchanger when such means is used. It is thus possible to make use of losses which would otherwise have gone to waste in the throttling in expansion valve 11.

With reference to the connected hot gas heat exchanger 8 it should be mentioned that heat can be extracted for heating domestic water to relatively high temperatures, even when operating at low condensation temperatures. For instance, with a condensation temperature of 40° C. hot water can to certain extent be heated to about 80° C. In the hot gas heat exchanger an amount of heat can be extracted which corresponds to about 25% of the entire heat emission in the circuit. By the previously described arrangement including hot gas exchanger 8, domestic water heating pump 13 and the radiator water heating pump, the various temperature levels prevailing in the hot water producing circuit and the radiator water heating circuit have been separated. It may be noted as an example that if the desired temperature of the domestic hot water is 50° C., the domestic water heating pump may be started at 45° C. and be in operation until a water temperature of about 55° C. is reached. As to the radiator water temperature it may be mentioned as an example that if the outdoor temperature is −10° C. and the desired temperature of the radiator return water is then 40° C., the radiator water heating pump starts at 37° C. and runs until 41° C. is reached. With an outdoor temperature of +20° C. and a return water temperature of 30° C. the pump starts at 28° C. and runs until a return water temperature of 32° C. has been reached.

As appears from the above description the present invention provides a heat pump plant in which losses have been minimized and the parallel heating of the domestic hot water circuit and the radiator water circuit can take place at different temperature levels. The invention is not deliminated to the above described embodiment and modifications of certain elements thereof are of course possible within the scope of the invention.

I claim:

1. A heat pump of the type including an evaporator, a compressor, a condenser, said condenser having a built-in subcooler and an expansion valve forming a refrigerant circuit, further comprising:
   a water heating pump having one end connected to said condenser heating medium outlet side;
   an ejector having first, second and third ports, said first port connected to a remaining end of said water heating pump through a non-return valve;
   a hot gas heat exchanger connected between the compressor and condenser inlet, said heat exchanger having a heating medium side with an outlet connected to said ejector second port, and an inlet;
   a second subcooler connected between an outlet of said built-in subcooler and said expansion valve, said second subcooler having a heating medium side connected to a separate heating circuit; and
   a domestic water heater having an inlet connected to said ejector third port, and an outlet connected to said hot gas heat exchanger inlet and said built-in subcooler inlet.

2. The apparatus of claim 1 further comprising:
   a water temperature sensing means;
   means connected to said water temperature means and said water pump for providing a flow of water to said ejector when the water temperature is below a predetermined level;
   a radiator heating pump connected between a radiator circuit and said condenser outlet;
   a second temperature sensing means for monitoring said radiator circuit water temperature;
   means connected to said second temperature sensing means for operating said radiator heating pump when said radiator water temperature is below a predetermined level; and
   a pump connected to the cooling medium side of said evaporator, said pump connected to operate when either of said radiator heating pump or said water heating pump is operating.

3. The heat pump of claim 1 further comprising:
   means for arranging priority between operation of said domestic water heating pump and said radiator heating pump, whereby said radiator heating pump is maintained out of operation until a certain domestic hot water temperature is reached, and thereafter enabled until a predetermined radiator water temperature is reached.

4. The heat pump of claim 1 further comprising:
   an air heat exchanger connected to the cooling medium side of said evaporator; and
   a storage vessel having a first circuit connected to the heating medium side of said second subcooler, and a second circuit serially connected through a pump and a non-return valve to said air heat exchanger.

5. The heat pump of claim 4 further comprising:
   means for sensing the outdoor temperature adjacent said air heat exchanger; and
   means for activating said serially connected pump in response to said outdoor temperature sensing, whereby heated medium is supplied from said storage medium through said air heat exchanger at predetermined intervals for defrosting said air heat exchanger.

6. A heat pump according to claim 1 further comprising:
   a soil heat circuit connected to said evaporator cooling medium side;
   said extra subcooler being connected to an air heating circuit; and
   a fan means for conveying air through said extra subcooler to said air heating circuit.

* * * * *

UNITED STATES PATENT AND TRADEMARK OFFICE
CERTIFICATE OF CORRECTION

PATENT NO. : 4,429,547
DATED : February 7, 1984
INVENTOR(S) : Eric Granryd

It is certified that error appears in the above-identified patent and that said Letters Patent is hereby corrected as shown below:

In column 6, line 23, change "1" to --2--;

on line 51, delete "extra" and insert therefor --second--;

on line 53, delete "extra" and insert therefor --second--.

Signed and Sealed this

Eighth Day of May 1984

[SEAL]

Attest:

GERALD J. MOSSINGHOFF

Attesting Officer     Commissioner of Patents and Trademarks